United States Patent [19]

Tung

[11] 4,101,643

[45] * Jul. 18, 1978

[54] PROCESS FOR RECOVERING SULFUR BY REMOVAL OF SULFUR DIOXIDE FROM GASEOUS MIXTURES

[76] Inventor: Shao E. Tung, 91 Blake Rd., Brookline, Mass. 02146

[*] Notice: The portion of the term of this patent subsequent to Oct. 5, 1973, has been disclaimed.

[21] Appl. No.: 728,174

[22] Filed: Sep. 30, 1976

Related U.S. Application Data

[63] Continuation-in-part of Ser. No. 499,582, Apr. 21, 1974, Pat. No. 3,984,529.

[51] Int. Cl.² .............................................. C01B 17/04
[52] U.S. Cl. .................................................. 423/575
[58] Field of Search ...................... 423/242, 243, 575; 55/73

[56] References Cited

U.S. PATENT DOCUMENTS

| | | | |
|---|---|---|---|
| 1,946,489 | 2/1934 | DeJahn | 423/243 X |
| 2,128,027 | 8/1938 | Clark | 423/243 |
| 3,633,339 | 1/1972 | Wiewiorowski | 423/242 X |
| 3,962,405 | 6/1976 | Annesser et al. | 423/242 |
| 3,984,529 | 10/1976 | Tung | 423/575 |
| 3,989,796 | 11/1976 | Morita et al. | 423/242 |

*Primary Examiner*—G. O. Peters
*Attorney, Agent, or Firm*—William R. Laney

[57] ABSTRACT

A process for removing sulfur dioxide from a mixture of gases and converting the removed sulfur dioxide to elemental sulfur. The sulfur dioxide is first contacted in a scrubbing zone with a scrubbing agent which is an aqueous solution of an alkali metal sulfite. The pregnant scrubbing solution is then contacted with an organic transfer reactant which is a water-immiscible long chain aliphatic amine to effect a transfer reaction in which the amine combines with sulfite ions to form organic amine sulfite, and regenerate the alkali metal sulfite scrubbing agent. In the final step of the process, the long chain aliphatic amine sulfite is heated to decompose the sulfite, releasing sulfur dioxide and regenerating the amine. The regenerated amine, as well as the regenerated alkali metal sulfite scrubbing agent, are recycled in the process, and the sulfur dioxide product can be optionally further reduced to elemental sulfur.

27 Claims, 1 Drawing Figure

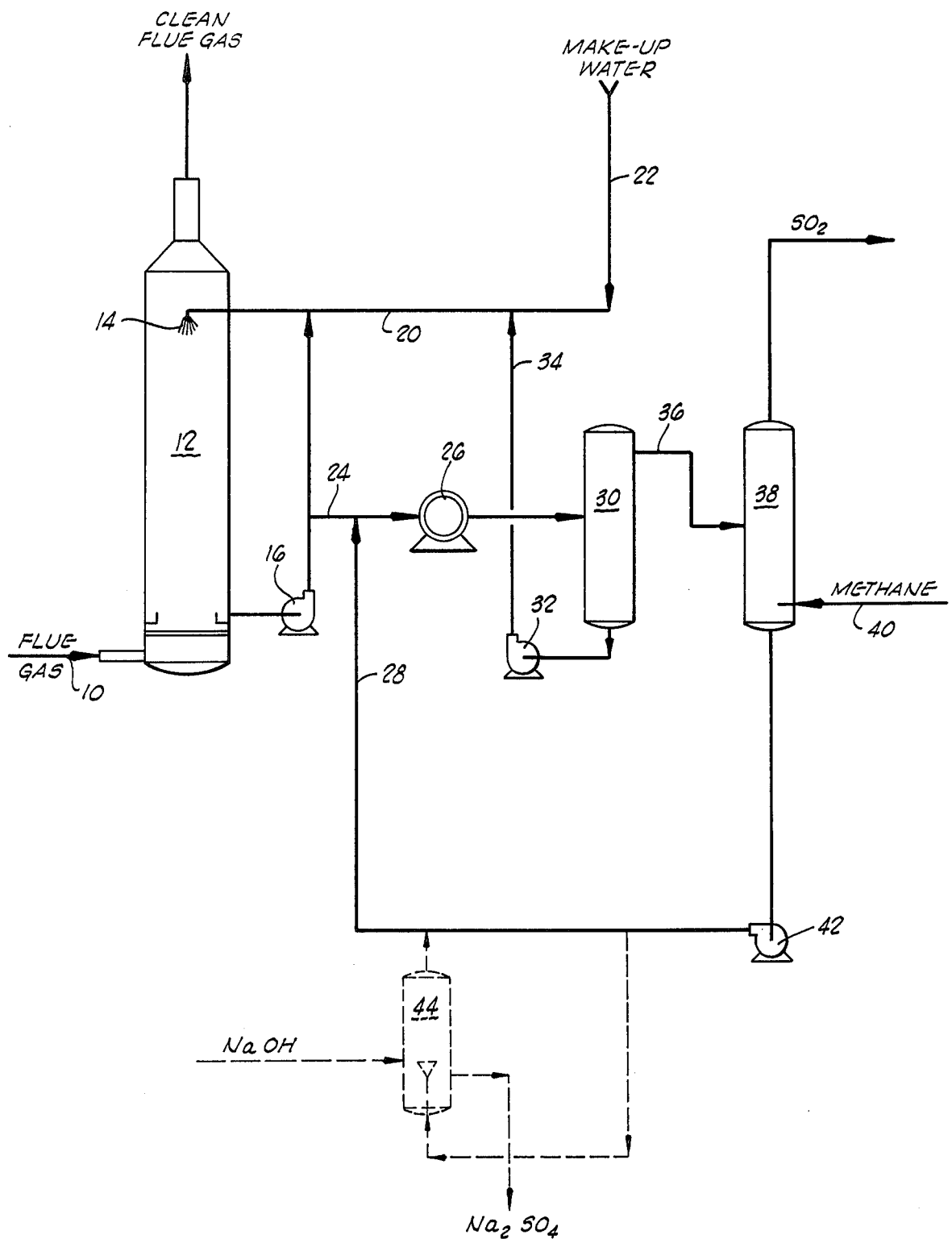

PROCESS FOR RECOVERING SULFUR BY REMOVAL OF SULFUR DIOXIDE FROM GASEOUS MIXTURES

RELATED APPLICATIONS

This application is a continuation-in-part of my co-pending U.S. application Ser. No. 499,582, entitled "Process for Recovering Sulfur by Removal of Sulfur Dioxide from Gaseous Mixtures" filed on Apr. 21, 1974, now U.S. Pat. No. 3,984,529.

BACKGROUND OF THE INVENTION

1. Field of the Invention

This invention relates to a process for removing relatively small quantities of sulfur dioxide gas from gaseous mixtures. More particularly, the present invention relates to processes for removing trace quantities of sulfur dioxide by subjecting a gaseous mixture containing such trace quantities to a scrubbing action with an alkali metal sulphite to yield a condensed phase aqueous mixture containing sulfite compounds, then extracting the sulfite ions from the pregnant aqeous scrubbing solution by contact thereof with an immiscible organic reactant to regenerate the scrubbing solution, followed finally by the release of concentrated sulfur dioxide gas from the extraction step organic phase in a form which is useful, per se, or can be easily converted to elemental sulfur.

2. Brief Description of the Prior Art

In my co-pending application Ser. No. 499,582, now U.S. Pat. No. 3,984,529 I review various prior efforts to provide economical and efficient processes for removing sulfur dioxide gas from gaseous mixtures such as stack gases or the like. Removal of sulfur dioxide is desirable in order to obviate or reduce atmospheric pollution, and also in order to avoid the loss of the economic value represented by the recovered sulfur or sulfur compounds constituting potential end products of the recovery process.

In my co-pending application, to which reference is made, I described certain proposed procedures for removing small or trace quantities of sulfur dioxide from gaseous effluents or mixtures of the type described, which processes or methods generally entail the steps of initially contacting the gaseous mixture which contains the sulfur dioxide with an aqueous solution containing a removal reactant so as to form a condensed phase in which the removed sulfur dioxide is combined chemically with the removal reactant in the form of sulfite or hydrosulfite compounds in aqueous solution. The removal reactants contemplated for use in the processes described in the co-pending application include, inter alia, alkali metal hydroxides, and salts of weak acids and alkali metal hydroxides.

After formation of the pregnant scrubbing solution which contains compounds including combined sulfite ions derived from the extracted $SO_2$ gas, the pregnant scrubbing solution is contacted with an organic liquid phase which includes, as an active component, certain nitrogen-containing water-immiscible organic compounds which have certain prescribed properties. Among such compounds which are effective and are preferred at this point in the process are various types of long chain alkyl amines which contain from about 12 to about 45 carbon atoms, and have a solubility in water of less than 0.2 gm/100 gms of water at 25° C. The result of contacting the pregnant scrubbing solution with the described amine-containing organic liquid phase is to transfer the sulfite ions from the pregnant aqueous scrubbing solution to the organic phase as a result of chemical combination of sulfite ions with the long chain alkyl amines. A concomitant result of the described contact is the regeneration of the scrubbing solution containing the selected removal reactant so that it can be recycled to the scrubbing zone, and used for contacting the gaseous mixture from which additional $SO_2$ is to be subsequently removed.

The organic phase developed upon contact of the long chain amine with the pregnant scrubbing solution contains long chain amine sulfites, and is contacted with hydrogen sulfide so as to reduce the sulfur-containing salts therein to elemental sulfur, and concurrently regenerate the long chain amine. The amine can then be reutilized for contacting additional sulfite-containing pregnant scrubbing solution from the scrubbing zone for the purpose of repeating the transfer of sulfite ions into the organic phase.

In Wiewiorowski U.S. Pat. No. 3,633,339, a process is prescribed for removing sulfur dioxide from gases, and initially entails contacting the gas containing the sulfur dioxide with an aqueous solution of ammonium phosphate. The pH of the thus constituted scrubbing solution is indicated by the patentee to be from about 3.0 to about 5.0, with the best range being between 3.5 and 4.5. The pregnant scrubbing solution contains ammonium hydrosulfite and ammonium phosphate. This pregnant scrubbing solution is then contacted with an organic extractant to extract sulfite ions into the organic phase. Subsequently, the organic phase is heated and subjected to stripping to yield concentrated sulfur dioxide gas therefrom.

Several problems characterize the Wiewiorowski process which make it of less than optimum efficiency in the removal of the sulfur dioxide gas from the polluted gas stream treated, and in the ultimate recovery of sulfur dioxde in concentrated form. The ammonium phosphate utilized as the active agent in the scrubbing solution has a pH sufficiently low, in contrast to certain other types of scrubbing agents, to place an undesirable limit on the capacity of the scrubbing solution to combine with and remove $SO_2$. In other words, the relatively low pH of the ammonium phosphate scrubbing solution reduces the capacity of the scrubbing agent to combine with, and carry out of the contaminated gaseous stream therewith, large quantities of $SO_2$ per pass of the scrubbing solution.

Further, though it is not a major feature of objection to the ammonium phosphate scrubbing process, the use of ammonium salt of this type tends to cause the formation of an undesirable "plume" at the top of the flue gas stack--an obviously undesirable aspect in terms of real, as well as apparent, atmospheric pollution. The plume results from finely divided ammonium salts apparently formed in the gas phase reactions.

After development of the pregnant scrubbing solution which comprises an aqueous solution of an ammonium hydrosulfite and ammonium phosphate salts, less than optimum selectivity is attained in the transfer of the sulfite ions to a given quantity or volume of the organic transfer reactant with which the pregnant scrubbing solution is contacted for sulfite ion extraction purposes. Thus, some of the amine compounds constituting the active extractive components in the organic phase at this step of the process will, indeed, combine with sulfite ions to effect the desired ion transfer preparatory to subsequent release of concentrated $SO_2$. A part of the amine compounds in the organic phase will, however, combine with phosphate ions, and will be rendered inaccessible to sulfite ions, and therefore ineffective for abstracting or carrying over into the organic phase, the sulfite ions constitutng the intermediate source of the ultimate sulfur dioxide product.

In other words, transfer of phosphate ions into the organic layer at this stage of the process effectively ties up a part of the amine compounds so as to render them inactive toward the sulfite ion transfer reaction. Therefore, a substantially greater total quantity of amine must be used, and more power is consumed in circulating the organic phase and its contained transfer reactant in the course of the process.

Further, the phospate ions which are introduced into the organic layer in this fashion must be separately removed (from the sulfite ions) to avoid their build-up and to regenerate the equivalent quantity of free amine compounds for reuse in the transfer reaction, and the result is a net depletion of phosphate ions from the regenerated scrubbing solution formed by contact between the pregnant scrubbing solution and the amine in the organic phase during the transfer reaction.

It will also be apparent from the described reduced selectivity of the organic transfer reaction, as a result of which a large portion of the organic phase extractant contains amine phosphates, that a greater amount of heat has to be applied to the total organic phase after occurrence of the transfer reaction, in order to release and drive off the relatively smaller quantity of sulfur dioxide which has been chemically combined with a given heated volume of the organic transfer reactant.

In another previously known $SO_2$ removal process, the aqueous solution of sodium sulfite is used for scrubbing purposes. The pregnant scrubbing liquor, which is essentially an aqueous solution of sodium hydrosulfite, is then directly (without intervening processes) decomposed thermally to yield sulfur dioxide. In this method of proceeding, however, the heat input required to effect thermal decomposition of the hydrogen sulfite, as well as to vaporize a large quantity of water, is great. The water vapor thus emitted with sulfur dioxide must be subsequently condensed. The development of the large quantity of water vapor also complicates control of the decomposition process.

Another serious drawback of the described process involving direct decomposition of the sodium hydrosulfite is that at the temperature level at which decomposition of the aqueous hydrosulfite occurs, a portion of the hydrosulfite converts to sulfate. This conversion commonly yields from 5 to 10% sodium sulfate by-product, which represents a corresponding loss in the total sodium value required in the system for scrubbing purposes. In addition, removal of the sodium sulfate by-product is a complicated procedure involving several process steps.

BRIEF DESCRIPTION OF THE PRESENT INVENTION

The present invention comprises an improved process for efficiently removing sulfur dioxide from a gaseous mixture containing the removed gas in small quantity. The end product produced by the process can be concentrated sulfur dioxide or elemental sulfur.

Broadly described, the process of the invention comprises initially contacting the gas from which the sulfur dioxide is to be removed with an aqueous solution of an alkali metal sulfite. In the course of this scrubbing step, the $SO_2$ in the gaseous mixture combines with the alkali metal sulfite to yield the hydrosulfite salt in aqueous solution. The pregnant aqueous solution resulting from scrubbing is next contacted with a liquid organic phase which contains one or more substantially water-immiscible long chain amine compounds capable of extracting sulfite ions from the pregnant scrubbing solution by chemical combination therewith. Upon the termination of intimate contact between the organic extractant phase and the aqueous phase, the alkali metal sulfite is regenerated in the aqueous phase so that the scrubbing solution thus formed can be recycled to the scrubbing zone of the process. The organic phase, which contains long chain amine sulfites upon completion of the transfer reaction, is then heated to a temperature sufficiently high that the amine sulfites therein undergo thermal decomposition to yield sulfur dioxide. The decomposition of the amine sulfites concurrently produces free amines which can be reused in carrying out further extraction of sulfite ions from additional scrubbing solution.

The sulfur dioxide generated by decomposition of the amine sulfite in the organic phase can be used as an end product, or it can be converted to elemental sulfur by various conventional methods known to the art.

An important object of the present invention is to obtain, through the process of the invention, maximum efficiency and selectivity in the transfer of sulfite ions from a scrubbing solution used for removing sulfur dioxide from gaseous mixtueres to an organic phase preparatory to subsequently heating the organic phase to release concentrated sulfur dioxide as an end product.

A further object of the invention is to provide a process for removing sulfur dioxide from a mixture of gases, which process produces an amine sulfite as an intermediate composition in the course of the process, and which process further entails the thermal decomposition of the amine sulfite without the simultaneous occurrence of the formation of any significant amount of a sulfate product.

A further object of the invention is to provide, in combination with the basic process of the invention, a simple and effective sulfate removal procedure which functions to continuously remove a constant amount of sulfate from the process streams, thus avoiding undesirable sulfate build-up in the process streams as a result of the removal of small amounts of $SO_3$ from the gaseous mixture treated in the process.

Another object of the invention is to achieve high efficiency in the scrubbing step by using a regenerated scrubbing solution which has a pH value normally higher than 4.5, and which can be as high as 7.

Another object of the invention is to provide a process for removing sulfur dioxide from a mixture of gases, and entailing the steps of scrubbing the gaseous mixture, followed by extraction of sulfite ions from the pregnant scrubbing solution and ultimately completed by releasing sulfur dioxide gas from the organic phase from the extraction or transfer zone by heating the organic phase. The heat input required to attain the decomposition of sulfite compounds formed during the transfer reaction is relatively low as compared with some other types of prior art processes in which the end formed product is sulfur dioxide produced by thermal decomposition.

An advantage of the utilization of the relatively high pH alkali metal sulfite solution as a scrubbing medium is its high sulfur dioxide-loading capability (i.e., one unit volume of the aqueous scrubbing solution of alkali metal sulfite salt can absorb a relatively large amount of $SO_2$ in comparison to scrubbing solutions having a lower pH). The relationship of the pH to $SO_2$ loading capacity can be shown by simple physical-chemical calculations for the sodium sulfite system.

| pH | Wt. percent uptake of $SO_2$ |
|---|---|
| $4 \rightleftarrows 5$ | 2 |
| $5 \rightleftarrows 6$ | 14 |
| $6 \rightleftarrows 7$ | 52 |
| $7 \rightleftarrows 8$ | 27.2 |
| $8 \rightleftarrows 9$ | 4.3 |
| $9 \rightleftarrows 10$ | 0.5 |

From the tabulated correlation of pH to $SO_2$ capacity, it can be perceived that the $SO_2$ combining capacity of the scrubbing solution having a pH of 5 or less is rather limited. A scrubbing solution having a pH of 6 can absorb about 8 times more sulfur dioxide than a scrubbing solution of pH 5, and a scrubbing solution of pH 7 can absorb 34 times as much sulfur dioxide as a scrubbing solution having a pH of 5. It will thus be perceived that the scrubbing solutions employed in the present invention afford real and marked advantage over those of the type used in the Wiewiorowski process and having a pH of from about 3 to about 5.

Another marked advantage of the process of the present invention occurs in the second step in which the pregnant aqueous solution is contacted with a liquid organic phase to effect the described transfer reaction. Such transfer reactions, using an aliphatic amine as a transfer reactant, may be written as follows when an ammonium phosphate aqueous solution is used as a scrubbing agent:

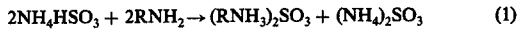

$$2NH_4HSO_3 + 2RNH_2 \rightarrow (RNH_3)_2SO_3 + (NH_4)_2SO_3 \quad (1)$$

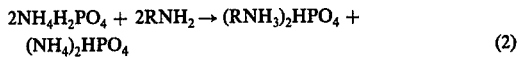

$$2NH_4H_2PO_4 + 2RNH_2 \rightarrow (RNH_3)_2HPO_4 + (NH_4)_2HPO_4 \quad (2)$$

or

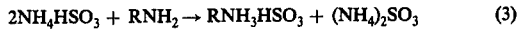

$$2NH_4HSO_3 + RNH_2 \rightarrow RNH_3HSO_3 + (NH_4)_2SO_3 \quad (3)$$

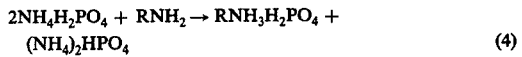

$$2NH_4H_2PO_4 + RNH_2 \rightarrow RNH_3H_2PO_4 + (NH_4)_2HPO_4 \quad (4)$$

In the Wiewiorowski process hereinbefore described, it is implied that the sulfite radicals are transferred via reactions (1) and (3) in preference to phosphate radicals via reactions (2) and (4). Though it may be accepted that the sulfite ion undergoes transfer in preference to the phosphate ions, 100% selectivity in the sense of complete transfer of sulfite ions to the exclusion of phosphate ions does not occur. Theoretically, $K_a(HSO_3^-) = (H^+)(SO_3^-) = 1.23 \times 10^{-7}$ or $pK(HSO_3^-) = 6.91$ and $K_a(H_2PO_4^-) = (H^+)(HPO_4^-)/(H_2PO_4^-) = 6.23 \times 10^{-8}$ or $pK(H_2PO_4^-) = 7.21$. Because these pK values are relatively close, it would appear that the binding power between the hydrosulfite ion and the amine, and that between the hydrophosphate ion and the amine, are not greatly different. Thus, one may expect that both the $HSO_3^-$ and $H_2PO_4^-$ ions will be transferred in significant quantities to the organic layer by combination with the amine cation.

It has been experimentally determined that when an aqueous solution containing equivalent molar quantities of $Na_2SO_3$ and $NaHPO_4$ are prepared by dissolving 10 gms of sodium sulfite and 12.7 gms of sodium hydrophosphate in 50 ml of water, and such solution is contacted with an alkyl amine sold under the trade name Primene JMT (and hereinafter described), about 15 to 30% of the phosphate ions will transfer to the organic layer by combination with the amine. As previously pointed out, such transfer of phosphate ions ties up a part of the amine compounds otherwise available for bonding to and accepting sulfite ions in the course of the transfer reaction. This therefore requires a greater total quantity of amine to effect the same extent of sulfite ion transfer, and more power is consumed in circulating the organic phase and its contained transfer reactant in the course of the process.

Among the additional objects and advantages which are achieved by the process of the present invention are:

The size of the apparatus and equipment which is required to carry out the process is small in comparison to the equipment previously used in many cases for removing noxious gases from industrial effluent gases.

The process of the invention requires a relatively low capital investment cost.

The operating cost of the process of the invention is low.

The process of the invention is highly reliable for continuous and uninterrupted operation.

The process can be employed to produce easily handled solid elemental sulfur as an end product.

The process can operate at relatively low temperature and at atmospheric pressure.

The process presents no severe corrosion problems.

Practically all of the process streams of the invention are pumpable.

Additional objects and advantages of the invention will become apparent as the following detailed description of preferred embodiments of the invention is read in conjunction with the accompanying single FIGURE of the drawing which illustrates apparatus which can be utilized in carrying out the process of the invention.

DETAILED DESCRIPTION OF PREFERRED EMBODIMENTS OF THE INVENTION

It may be state at the outset that those considerations which relate to the type of scrubbing apparatus which can be employed in carrying out the process of the present invention, and those physical-chemical parameters and considerations which are indicated to be applicable to the processes described in my co-pending application Ser. No. 499,582, apply to the first and second steps of the process of the present invention, and are incorporated by reference herein. In the instant application, however, the proposed process acknowledges and makes use of the peculiar advantages of employing specific types of removal reactants as the active component of the scrubbing solutions used in the first step of the process.

The scrubbing solutions utilized in the process of this invention comprise aqueous solutions of a compound selected from the group consisting of alkali metal sulfites, and of these, sodium sulfite ($Na_2SO_3$) constitutes the preferred material.

The scrubbing solution utilized preferably contains the removal reactant in a concentration of from about 3 to about 8 moles per 100 moles of water.

In general, and with a more detailed description being hereinafter set forth, the scrubbing step of the process of the invention is carried out by gravitating the scrubbing solution downwardly in a scrubbing column which may have one or preferably more scrubbing stages, and concurrently directing the gaseous mixture containing the sulfur dioxide to be removed and recovered countercurrently with respect to the scrubbing solution. Typically, such gaseous mixtures may be derived from an industrial plant and the gaseous mixture scrubbed may be at relatively high temperature, and frequently will contain trace or relatively minute quantities of sulfur dioxide. Preferably, prior to charging the gaseous mixture to the scrubber column or zone, it will have been subjected to a de-ashing or solid particle removal procedure in order to cleanse the gas of entrained solid pollutants.

In the scrubbing zone, the reaction which occurs is generally that of chemical combination of the removal reactant (alkali metal sulfites) with the sulfur dioxide to form the corresponding hydrosulfite. Alkali metal sulfites are capable of capturing and carrying a large amount of the sulfur dioxide in the form of water-soluble hydrosulfite without yielding a significant partial pressure of sulfur dioxide to the gas phase. The equilibrium relationships which control and are indicative of the partial pressure of this gas over an aqueous sulfite solution are set forth and discussed at length in my co-pending application Ser. No. 499,582.

The initial scrubbing reaction, using normal sodium sulfite for example purposes, can be written as:

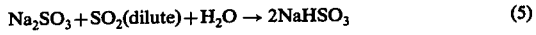

$$Na_2SO_3 + SO_2(\text{dilute}) + H_2O \rightarrow 2NaHSO_3 \quad (5)$$

Rapid regeneration of the scrubbing solution is accomplished by a transfer reaction constituting the second step of the process of the present invention. In the transfer reaction, the cation of the hydrosulfite compound in the spent or pregnant scrubbing solution is replaced by a long chain aliphatic amine, and the sulfite ion is simultaneously transferred from the aqueous phase to an organic phase. Among the suitable active transfer reactants are long chain alkyl amines which include primary, secondary and tertiary amines. When alkyl amines are so used, the function of the long chain alkyl group is essentially to render the amine hydrophobic (i.e., organic soluble) rather than hydrophilic (i.e., water soluble). To fulfill this functional requirement, the 'alkyl substituents' of the nitrogen atoms in the transfer reactants as here defined can be straight chain or branched, and the hydrogen atoms attached to the carbon atoms of the carbon chain can be substituted in varying degree with substituents and structural or functional groups which are chemically inert with respect to the reactants and solvents encountered in the transfer reaction, as long as such substitution does not materially lower the transfer capacity (or G value) of the parent transfer reactant before substitution.

In addition to alkyl groups which are normally defined as saturated hydrocarbon chains, carbon chains (substituted or unsubstituted) with unsaturate bonds are also usable, since the presence of the unsaturation does not significantly affect the hydrophobic nature of the amine. However, the presence of unsaturated bonds must not materially change the chemical inertness or materially lower the transfer capacity (or G value) of the amines. Hence a better term to more suitably describe the transfer agents is long chain aliphatic amines (substituted or unsubstituted) rather than alkyl amines.

Aromatic amines in which the nitrogen atom of the amine group is a part of the six-member ring are generally unsuitable because their transfer capabilities are generally too low.

Aliphatic amines whose hydrocarbon chains (substituted or unsubstituted) have unsaturate bonds as described in the preceding paragraph are also usable in the process described in my co-pending U.S. application Ser. No. 499,582 where the aliphatic amine sulfite is subsequently reduced by hydrogen sulfide to elemental sulfur. Here again the presence of unsaturated bonds must not materially change the chemical inertness or materially lower the transfer capacity (or G value) of the amines.

A suitable transfer agent must have low water solubility. A typical solubility value used as a guide in the selection of water-immiscible amines is about 0.2 gm/100 gms water at 25° C (i.e., the free amine transfer reactant should have a water solubility of less than about 0.2 gm/100 gms water). Water immiscibility is necessary so that the regenerated scrubbing liquor from the transfer reaction can be separated directly from the organic phase and recycled to the scrubber.

High water solubility indicates that higher leakage of the amine transfer reactant into the water phase will occur, or such leakage will occur to the regenerated aqueous liquor. Even as free amine is used as the transfer reactant, most of the occurrent leakage will result due to the leakage of the amine salts which are formed from the amine during the transfer reaction, since the salts are generally more soluble than their parent free amine base. Generally, with aliphatic amines, such water-immiscible amines will have aliphatic substituents containing at least 8 carbon atoms. In the case of some highly branched amines (e.g., highly branched tertiary alkyl primary amines), however, the aliphatic groups may have a few as 8 carbon atoms and still exhibit sufficient water immiscibility. 1-4 dimethyl pentylamine, a $C_7$ alkyl amine, has a water solubility below 0.2 gm/100 gms water, and can also be used in admixture with amines having 8 or more carbon atoms. The amines preferably do not contain more than 45 carbon atoms in the several alkyl substituents.

Commercially available long chain alkyl amines are usually furnished as a mixture of amines of various alkyl chain lengths. When such a mixture is used, amines of higher solubility are more tolerable when such amines constitute only a minor fraction of the total mixture. Moreover, although short chain alkyl amines having solubilities which exceed 0.2 gm/100 gms water at 25° C are considered undesirable under normal circumstances because of their high leakage loss, these amines nevertheless have generally higher basicity than long chain alkyl amines, and in some instances, the addition of small amounts of such amines to the solvent system is advantageous, as will be discussed in greater detail hereinafter.

Another characteristic which must inhere in the transfer reactant is that such compound must not form a stable emulsion with the aqueous solution. The transfer reactant must be an organic-soluble compound, or itself be a liquid capable of providing a distinct organic phase when contacted with the spent aqueous scrubbing liquor. Amines with unsubstituted alkyl chains generally perform better than amines with substituted alkyl groups, and are therefore normally preferred.

Other desirable properties of the transfer reactants used in the invention, and encompassed by the relatively broad identification set forth above, will be hereinafter described.

The spent scrubbing liquor is essentially an aqueous hydrosulfite solution, and when a long chain alkyl primary amine is used as the transfer reactant, the transfer reaction may be written as $$2MHSO_3(aq) + 2RNH_2(org) \rightarrow (RNH_3)_2SO_3(org) + M_2SO_3 aq \quad (6)$$

or, $$2MHSO_3(aq) + RNH_2(org) \rightarrow RNH_3 \cdot HSO_3(org) + M_2SO_3(org) \quad (7)$$

where M denotes an alkali metal cation, R denotes an alkyl radical, and (aq) and organic aqueous phase and organic phase, respectively. A principal advantage of using alkali metal sulfite as a scrubbing agent is that in this transfer step only sulfite can and will be transferred to the organic phase, while in the case of other salts (e.g., $Na_2HPO_4$ or $(NH_4)_2HPO_4$) other radicals (e.g., $HPO_4^-$) will be transferred to the organic phase as well. In other words, when sulfite is used as a scrubbing agent, the selectivity is assuredly 100%, and this can never be fully realized if other types of salts are used.

It is generally desirable, although not always necessary, to dissolve the water-immiscible primary amine in a water-immiscible organic solvent, such as kerosene. As the amine sulfite salt formed is water insoluble, but organic soluble, the net result of this reaction is a transfer of the sulfite ion from the aqueous phase to the organic phase. The normal sulfite regenerated in the aqueous phase according to reaction (6) is then suitable for recycling and further scrubbing use.

In order to consider in greater detail the transfer capability of transfer reactants useful in the present invention, a parameter referred to as "G value," and hereinafter defined, can be advantageously employed as a measure of transfer capability. It is generally preferred to use a transfer reactant having a high "G value," thus attaining relatively high efficiency in effecting the transfer of sulfite anions from the salts present in the pregnant scrubbing solution to organo-sulfite compounds of the type heretofore described.

In general, any organo-nitrogen compound with a characteristic basic functional group of the type $-NH_2$, $>NH$, and $>N-$ displays some "transfer capability" for hydrosulfite anions. The "transfer capability" can be defined in several ways, such as in terms of the distribution of sulfite ions as between the organic and aqueous phases present in the transfer reaction system. A more suitable mode of defining the "transfer capability" of the transfer reactant, however, is in terms of a "G value," which is defined as, $$G = \frac{\text{Equivalents of sulfur in a kerosene base organic phase}}{\text{Total moles of amine in kerosene}} \quad (8)$$

It will be seen in referring to Equation (8) that the G value is an expression of the efficiency of transfer of sulfite ions from the aqueous to the organic phase, based upon the degree to which all of the moles of amine cations present in the organic phase have become bonded to anions containing sulfur. It will further be apparent that where the product of the ion transfer is amine sulfite, the maximum G value obtainable is 0.5, and where the product is amine hydrosulfute, the maximum G value is 1.0. The transfer capability of a particular transfer compound can therefore be judged by the way in which its G value relates to these maximum G values which are attainable in reactions which yield amine sulfite and amine hydrosulfite, respectively. Because kerosene is a relatively inexpensive organic solvent which works well in carrying out the transfer reaction, it has been used as the basis for computing the G value for practical reasons. It should be pointed out, however, that G values can be calculated in reference to other solvents equally expediently.

The numerical magnitude of the G value depends upon the initial hydrosulfite concentration in the aqueous phase and the initial amine concentration in the organic phase in the transfer experiment. When these conditions are kept constant, the G value adequately measures the effectiveness of an amine in effecting hydrosulfite transfer. For this purpose, the G value can be conveniently determined as follows: 10 ml of an aqueous solution containing 3.37 mmols of sodium hydrosulfite per ml is shaken with 16.85 mmols of the long chain amine dissolved in an equal volume of kerosene in a separatory funnel for a period of five minutes. The two layers are allowed to separate, and the sulfite content of the organic layer is determined. The G value can then be calculated according to Equation (8).

The selection and use of a transfer reactant having a relatively high G value affords a high transfer per pass (during the cyclic operation of the process), and a correspondingly reduced volumetric recirculation need for the regenerated transfer reactant and its solvent (if one is used) in the operation of the process. The significance of this practical advantage becomes more apparent when it is considered that in the case of transfer reactants having long chain aliphatic substituents, the recirculation of the large molecule transfer reactants entails a relatively high cost of recirculation in relation to the chemical activity of each molecule of the transfer reactant employed.

In reference to the characteristic G values of those transfer reactants which can be used to advantage in the process of the present reaction, I prefer to employ transfer reactants having a G value exceeding 0.15. Above this minimum G value, more suitable results are obtained where the G value is higher than 0.3, and the best results are achieved if such transfer reactant has a G value exceeding about 0.4. Alkyl amines are commercially available having G values higher than 0.5.

In the selection of a transfer reactant for carrying out the transfer step of the present invention, basicity of the reactant (which is closely related to the G value), and solubility of such reactant in the organic phase, are significant considerations where the transfer reactant is to be dissolved in, and recirculated with an organic solvent. With respect to basicity of long chain aliphatic amines, the basicity generally decreases according to increased substitution by aliphatic groups of the nitrogen atom, i.e, primary amines > secondary amines > tertiary amines. Branching of the aliphatic substituents tends to decrease the basicity of the amine to some degree, but it also improves the solubility of such transfer reactants in organic solvents of the types hereinafter described. Considering basicity and organic solubility together, tertiary aliphatic primary amines are those which afford the best results and therefore constitute the most preferred transfer reactants.

When the basicity and the water solubility of the transfer reactant are considered together, the addition of some relatively low molecular weight, and therefore more water-soluble, aliphatic amines (e.g., $C_7$ or $C_6$ aliphatic amines) to the water-immiscible solvent systems is occasionally beneficial.

In further relation to organic solubility, as such must be considered where the preferred mode of carrying out the present invention is in use, and the transfer reactant is dissolved and recirculated in a suitable organic solvent, it may be noted that the organic solubility of the transfer reactants of the type described can be improved by adding to the organic solvent, as a transfer reactant solubility promoter, from about 3 to about 5 weight percent of a long chain alkanol (containing, for example, from about 12 to about 24 carbon atoms).

Within the broadly defined range of chain length and water immiscibility characteristics hereinbefore set forth, it is preferred to use aliphatic amines having a molecular weight in the range of from about 180 to about 650, and the salts derived therefrom.

There are a number of amines which satisfy the broad criteria above described, as well as the desiderata employed in the selection and use of preferred or most suitable amines as set forth above. A partial listing of commercially available aliphatic amine free bases which perform well includes: an isomeric mixture of tertiary alkyl primary amines each having a chain length in the $C_{18}$–$C_{22}$ range, and sold under the tradename Primene JMT; an isomeric mixture of tertiary alkyl primary amines each having a chain length in the $C_{12}$–$C_{14}$ range and sold under the tradename Primene 81R; a mixture of N-dodecenyl-N-trialkylmethyl amines each containing from 24 to 27 carbon atoms and sold under the tradename Amberlite LA-1; and a mixture of N-lauryl-N-trialkylmethyl amines each containing from 24 to 27 carbon atoms, and sold under the tradename Amberlite LA-2 (all the foregoing are marketed by the Rohm & Haas Company of Philadelphia, Pa.); methyl di-(n-octyl) amine and 1-(3-ethylpentyl)-4-ethyloctyl amine.

I have previously determined experimentally that when a tertiary alkyl primary amine, such as Primene JMT, is used, practically all hydrosulfite is removed from the aqueous phase according to reactions (6) and (7). The pH value of the regenerated scrubbing solution is relatively high, i.e., normally larger than 4.5, and can readily be as high as 7. High pH is desirable to effect a high sulfur loading in the scrubbing operation as hereinbefore discussed.

As previously indicated, it is preferred to place the transfer reactant in an organic solvent for carrying out the transfer reaction, even though many liquid amines can be employed without such solvent, and themselves constitute the organic phase used in the transfer reactions. Solution in an organic solvent improves the flow characteristics of the amine and increases the speed of phase disengagement. Organic solvents which can be effectively emloyed include water-immiscible alcohols, ketones, ethers and esters, and hydrocarbons such as benzene, toluene, xylene, kerosene, heavy naphtha and light gas oil. The solvent selected and used should preferably be non-toxic, of relatively low volatility, substantially water-insoluble and chemically inert toward the reactants and any other solvents in the zones in which the transfer reactions are carried out. Kerosene boiling in the range of from about 350° F to about 600° F is the preferred solvent.

I have experimentally determined that the organo-sulfur-bearing compounds resulting from the transfer reaction can be fairly easily and readily decomposed by subjecting the pregnant organic phase from the transfer reaction to elevated temperature. The decomposition reactions occurring upon heating may be formally represented by equations

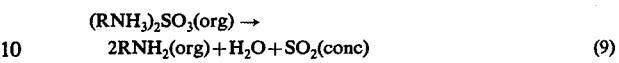

$$(RNH_3)_2SO_3(org) \rightarrow$$
$$2RNH_2(org) + H_2O + SO_2(conc) \qquad (9)$$

or

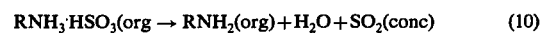

$$RNH_3 HSO_3(org \rightarrow RNH_2(org) + H_2O + SO_2(conc) \qquad (10)$$

In explanation of the observed decomposition reactions, it appears plausible to assume that long chain amines, like ammonia, lose basicity rapidly as temperature is increased, and hence at the higher or elevated temperatures, the binding force of the amine cations to the sulfite and hydrosulfite anions becomes rather weak, with the result that these salts decompose readily. Some experimental results obtained in the observation of the phenomenon are set forth in Table I.

TABLE I

| Temperature | Mole % Normal Sulfite Salt Not Decomposed | |
|---|---|---|
| (° C) | Primene JMT | Amberlite LA-2 |
| 30° C | 105* | 65 |
| 40° C | 80 | 55 |
| 75° C | 45 | 3 |
| 90° C | 5 | — |

*105 mole % is due to the presence of some hydrosulfite in the organic phase.

This table shows that the sulfite of Primene JMT decomposes almost completely at 90° C, and that the sulfite of Amberlite LA-2 decomposes almost completely at 75° C.

Because of the bonding strength at the decomposition temperature, the heat required for decomposition is extremely low. Furthermore, only $SO_2$ will be emitted and, consequently, no heat is needed to vaporize a portion of water as is the case in prior art processes. No significant side reactions yielding undesirable side products, such as the conversion of sulfite to sulfate, were detected to occur in the course of the decomposition.

In the final step of the process of the invention, the organic layer or phase derived from the transfer reaction, and containing amine sulfite and hydrosulfite, is heated to a temperature exceeding about 70° C, and in the case of Primene JMT, preferably to about 90° C, to effect decomposition of the amine compounds. Preferably, a stripping gas, such as methane, is admitted to the thermal decomposition zone concurrently with the heating, and is passed through the organic liquid containing the amine sulfites to provide a stripping action aiding in carrying the product sulfur dioxide out of the thermal decomposition zone. In this way, the sulfur dioxide is produced in concentrated form and may be recovered as such, or reduced to elemental sulfur or converted to sulfuric acid by processes well known and understood in the art. The upper limit of the temperature to which the amine sulfites and hydrosulfites can be heated is dictated by the practical level or value at which chemical deterioration of the regenerated basic organic compounds (transfer reactants) will commence.

Not infrequently, the gaseous mixture from which the sulfur dioxide is to be removed by the process of the present invention will also contain some $SO_3$. In such cases, sulfate compounds will also be present in the spent scrubbing liquor. Sulfate ions will be transferred, similarly to the sulfite ions, to the organic transfer reactant and will, over a period of continuous operation and recycling, begin to accumulate and build up in the organic phase employed in the transfer reaction. In such instances, the sulfate level in the organic phase is controlled by subjecting a side stream split off from the recirculated amine (following regeneration of the free amine by decomposition of the sulfite and hydrosulfite compounds) to contact with an alkaline solution, such as sodium hydroxide or ammonium hydroxide. Contact with the alkaline solution effectively removes substantially all of the sulfate ions as a result of chemical combination with the basic cations contained in the alkaline solution. Any small quantity of sulfite or hydrosulfite ions which remain in the organic phase after the thermal decomposition and stripping operation is also removed. The washed and regenerated organic phase in the slip stream, which now contains the amine transfer reactant in the organic solvent, is then returned to the main organic stream and recycled to the zone in which the transfer reaction is carried out in the second step of the process. The ammonium or sodium sulfate and sulfite compounds produced by the described scrubbing of the slip stream can be treated to recover the salts therefrom. Alternatively, the ammonium or sodium ion can be replaced by calcium ions, and calcium sulfate then becomes the major final by-product of the process. By the use of the latter procedure, there is no sodium lost from the system, although some relatively low value by-product material is produced.

The process of the present invention offers three major advantages over the Wiewiorowski process previously proposed. First, the regenerated scrubbing liquor of the present invention has a pH which is normally higher than 4.5 and can easily be as high as 7, in contrast to that of the Wiewiorowski process, which has a pH ranging from 3.0 to 5.0. . As pointed out hereinbefore, a scrubbing liquor of pH = 7 can absorb about 34 times more $SO_2$ than can a scrubbing liquor of pH = 5. Second, in the process of the present invention, the selectivity for sulfite transfer is assuredly 100%, which cannot possibly be achieved when salts of other types are used as a scrubbing agent. Third, by using sodium salt rather than ammonium salt, the chance of the formation of an ammonium salt-induced plume is completely eliminated.

When compared with the prior art processes entailing a final step of thermal decomposition of sulfite salts in the aqueous scrubbing solution, the present invention also offers several significant advantages. First, the heat needed for decomposition of amine hydrosulfite and amine sulfite is relatively low. In addition, no heat is needed to vaporize a portion of water. Control is also easier in the present process, due to the elimination of water condensation. Second, no significant undesirable side reactions, such as conversion of sulfite to sulfate, are found to occur in my process. Third, the present process offers a practical and simple procedure for sulfate removal, such that the sulfate will not build up in the process streams. Other advantages will be apparent in examining the example which is described below.

EXAMPLE

Employing the system schematically illustrated in the drawing, approximately 240,000 standard cubic feet per minute of flue gas generated by a 100 mw power plant which burns a 3 weight percent sulfur coal is treated. The flue gas is discharged from the plant at a temperature of 300° F, and is constituted, on a per minute basis, of essentially 4,190 lbs. of $CO_2$, 99.6 lbs. of $SO_2$, 598 lbs. of $O_2$, 14,120 lbs. of $N_2$ and 891 lbs. of water vapor. The flue gas is charged via a conduit 10 to the bottom of a conventional scrubber 12, and is moved upwardly in the scrubber countercurrently to a scrubbing solution discharged from a nozzle 14 in the top of the scrubber, and gravitating downwardly therefrom.

Though the schematic illustration of the scrubber does not illustrate its details of construction, it is of the type described in my co-pending application Ser. No. 499,582, and consists of three separate absorption stages. At each stage, the scrubbing solution flows downwardly from the top of the scrubber countercurrently to the flow of upwardly rising flue gas, and is collected in a sump situated at the bottom of each of the stages. From each sump, a portion of approximately 4/5 of the scrubbing solution is recycled by a suitable pump to the top of the same stage, and another portion of approximately 1/5 of the liquid is charged to the top of the next lower stage. Thus, while a major portion of the scrubbing solution is constantly recycling within each stage, there is a minor portion of the scrubbing liquid passing downwardly from stage to stage and eventually withdrawn from the bottom of the scrubbing column for regeneration treatment.

About 90 percent of the $SO_2$ in the flue gas is removed by the scrubber column 12, and the clean flue gas, consisting essentially of 4,190 lbs. (per minute) of $CO_2$, 10.0 lbs. of $SO_2$, 598 lbs. of $O_2$, 14,120 lbs. of $N_2$ and 1,780 lbs. of water vapor is eluted from the top of the scrubbing column at about 128° F.

The material recycled from the sump at the bottom or lowermost stage within the column is recycled to the top of the scrubber column 12 by a suitable pump 16.

Regenerated scrubbing solution from a conduit 20 and produced in the manner hereinafter described, is admitted via nozzle 14 to the top of the scrubber 12 each minute, and consists of 242.5 lbs. or normal sodium sulfite, 39.5 lbs. of sodium hydrosulfite, and 952.2 lbs. of water at 70° F. To this stream, make-up water at 70° F is added at the rate of 911.3 lbs. per minute from the conduit 22.

A slip stream derived from the recycling scrubbing solution directed from the pump 16 to the top of the scrubbing column is passed through a conduit 24, and is constituted, on a per minute basis, of 65.5 lbs. of normal sodium sulfite, 332.0 lbs. of sodium hydrosulfite and 952.2 lbs. of water. The slip stream is initially passed to a pump mixer 26, where it is intimately mixed with regenerated organic transfer reactant solution from the conduit 28 and constituted as hereinafter described.

The regenerated organic transfer reactant solution charged to the pump mixer 26 via conduit 28 consists of 834.0 lbs. of Primene JMT, 50 lbs. of Primene sulfite and 765.7 lbs. of kerosene with the stream at 70° F (on a per minute basis). The volume ratio of the total Primene to kerosene present in the organic solution is 1.

From the pump mixer 26, the solution comprising an intimate mixture of both the aqueous and organic phases is charged to a holding column 30, where the two layers are permitted to separate. The aqueous layer, which is the regenerated scrubbing liquid, is pumped by a suitable pump 32 to the top of the scrubbing column via conduits 34 and 20, as previously described.

The organic layer from the top of the holding column 30 is charged via a conduit 36 to a stripping column 38. The material passed through the conduit 36 is constituted, each minute, by 999 lbs. of Primene sulfite and 765.7 lbs. of kerosene. In the stripping column 38, the pregnant organic transfer solution is heated to a temperature of from 80° to 90° C to commence decomposition of the primene sulfite. Concurrently, methane or a tail gas which may suitably be derived fom a Claus reactor is admitted to the bottom of the stripping column 38 through a conduit 40 to strip off the $SO_2$ produced upon decomposition of the Primene sulfite. 89.9 lbs. of $SO_2$ per minute is continuously withdrawn from the top of the stripping column, and can be liquefied, converted to elemental sulfur or converted to sulfuric acid.

Decomposition of the Primene sulfite and concurrent removal of sulfur dioxide regenerates the Primene JMT constituting the organic transfer reactant. The Primene JMT, in the described kerosene solution, is continuously withdrawn from the bottom of the stripping column 38 and, by means of a pump 42, is returned through the conduit 38 to the pump mixer 26 as previously described.

Reference has previously been made herein to the method employed for removing any sulfate which may be developed in the organic transfer reaction phase as a result of the presence of some $SO_3$ in the stack gas treated. Where Primene sulfate is present in the pregnant or spent organic transfer solution, it will normally not be thermally decomposed, as in the case of the sulfite, but will be carried out of the stripper column 38 with the regenerated transfer reactant solution. Since the sulfate content will continue to build up over a period of time, and thus inactivate increasing quantities of the Primene in relation to effective sulfite absorption capability, it is desirable to remove the sulfate ions from the regenerated transfer reactant solution. For this purpose, an absorption column 44 containing an alkaline solution, such as ammonium hydroxide or sodium hydroxide, is used for intimately contacting a slip stream split off from the recycled regenerated organic transfer reactant discharged from pump 42. The sulfate-containing organic solution passed through the column 44, and undergoing intimate liquid-liquid contact with the alkaline solution therein, is freed of the sulfate ion as a result of the formation of alkali sulfate. The organic phase ascends to the top of the column 44 and separates from the more dense aqueous alkaline solution with which it is immiscible. From the top of the column 44, the sulfate-free slip stream is then remerged with the main stream of regenerated organic transfer reactant and passed to the pump mixer 26. The described expedient can be used in the practice of the process of the invention for keeping the organic transfer reactant sufficiently free of sulfate ion to prevent frequent down-time requirements, and to permit continuous operation of the process over extended periods of time.

Although certain preferred embodiments of the present invention have been herein described in order to illustrate the basic principles upon which the effectiveness and operativeness of the invention are based, it will be understood that various changes and innovations in the process conditions and reaction parameters can be effected without departure from such basic principles. Changes and innovations of this type are therefore deemed to be circumscribed by the spirit and scope of the invention, except as the same may be necessarily limited by the appended claims or reasonable equivalents thereof.

What is claimed is:

1. A process for removing sulfur dioxide from gaseous mixtures comprising:

contacting the gaseous mixture in a scrubbing zone with a removal reactant consisting essentially of an aqueous solution of an alkali metal sulfite to form an aqueous solution of an alkali metal hydrosulfite salt;

contacting, in a transfer reaction zone, the aqueous solution of said hydrosulfite salt with an organic liquid phase which includes at least one nitrogen-containing organic compound which does not form a stable emulsion with water, and which is selected from the group consisting of aliphatic amines containing from about 8 to about 45 carbon atoms, and having a solubility in water of less than 0.2 gm/100 gms water at 25° C, to yield, by a transfer reaction, an organic liquid phase containing at least one sulfur-containing salt of said nitrogen compound, and to concurrently regenerate said removal reactant;

separating the organic liquid phase containing said sulfur-containing nitrogen compound from the aqueous solution; then heating the organic liquid phase to a temperature of at least 70° C to decompose the sulfur-containing salts to yield sulfur dioxide and regenerate said nitrogen-containing compound.

2. The process defined in claim 1 wherein the removal reactant is sodium sulfite.

3. The process defined in claim 1 wherein said nitrogen-containing compound is a tertiary alkyl primary amine.

4. A process for removing sulfur dioxide as defined in claim 1 wherein said nitrogen-containing organic compound contains one of the groups

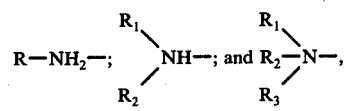

where $R_1$–$R_3$ designate aliphatic hydrocarbon radicals containing, in total, from about 8 to about 45 carbon atoms, and where said nitrogen-containing organic compound has a G value of at least 0.3.

5. A process for removing sulfur dioxide as defined in claim 1 and further characterized as including the step of recycling, to the zone of contact of the aqueous solution with the organic liquid phase, the regenerated nitrogen-containing organic compound yielded by said heating of the organic liquid phase.

6. The process defined in claim 1 and further characterized as including the step of passing an inert stripping gas through said organic liquid phase containing said sulfur-containing salt concurrently with the heating thereof.

7. The process defined in claim 1 wherein said nitrogen-containing organic compound is a liquid and constitutes the only compound in said organic liquid phase.

8. The process defined in claim 1 wherein said organic liquid phase consists essentially of said nitrogen-containing organic compound dissolved in a water-immiscible organic solvent.

9. A process for recovering sulfur dioxide as defined in claim 1 wherein said nitrogen-containing organic compound has a G value of at least 0.15.

10. A process as defined in claim 1 wherein said nitrogen-containing organic compound is an alkyl amine having a molecular weight of from about 180 to about 650.

11. The process defined in claim 1 wherein said aqueous solution of a sulfur-containing compound is contacted with said organic liquid phase to effect said transfer reaction at a temperature of from about 0° to about 50° C.

12. The process defined in claim 1 wherein said aqueous solution of a sulfur-containing compound is contacted with said organic liquid phase to effect said transfer reaction at a pressure of from about atmospheric pressure to about 2000 psi.

13. The process as defined in claim 3 wherein said tertiary alkyl primary amine contains from 18 to 22 carbon atoms.

14. A process as defined in claim 8 wherein said water-immiscible organic solvent is kerosene.

15. A process as defined in claim 1 wherein said nitrogen-containing organic compound has a G value of at least 0.4.

16. A process as defined in claim 8 wherein said water-immiscible solvent has dissolved therein an alkanol containing from about 12 to about 24 carbon atoms to promote the solubility of said nitrogen-containing organic compound in said organic solvent.

17. A process as defined in claim 1 and further characterized as including the step of recycling said aqueous solution of said one removal reactant, as regenerated by said transfer reaction, to said scrubbing zone.

18. The process defined in claim 1 wherein said organic liquid phase is heated to a temperature of from about 70° to about 90° C.

19. The process defined in claim 2 wherein said nitrogen-containing compound is a tertiary alkyl primary amine.

20. The process defined in claim 19 wherein said nitrogen-containing organic compound has a G value of at least 0.4.

21. The process as defined in claim 20 and further characterized as including the step of recycling said aqueous solution of said one removal reactant, as regenerated by said transfer reaction, to said scrubbing zone.

22. The process defined in claim 21 and further characterized as including the step of recycling, to the zone of contact of the aqueous solution with the organic liquid phase, the regenerated nitrogen-containing organic compound yielded by said heating of the organic liquid phase.

23. The process defined in claim 22 wherein said organic liquid phase is heated to a temperature of about 90° C.

24. A process as defined in claim 1 and further characterized as including the further steps of
contacting at least a portion of said organic liquid phase containing said regenerated nitrogen-containing compound with an alkaline solution to remove entrained sulfate ions therefrom at a point in time after said heating is completed; then
recycling said portion of said organic liquid phase contacted with said alkaline solution to said transfer reaction zone.

25. The process defined in claim 24 wherein said alkaline solution is an aqueous solution of sodium hydroxide.

26. The process defined in claim 24 wherein said alkaline solution is an aqueous solution of ammonium hydroxide.

27. A process for removing sulfur dioxide from a gaseous mixture comprising:
contacting the gaseous mixture in a scrubbing zone in the presence of water with at least one removal reactant selected from the group consisting of aqueous solutions having a pH of at least 4.0 of a salt of a weak acid and an alkali metal hydroxide, said weak acid precursor of said salts being an acid having an ionization constant (pKa) value of at least 4.0, to form an aqueous solution of a sulfur-containing salt;
contacting said aqueous solution of a sulfur-containing salt with an organic liquid phase which includes at least one nitrogen-containing, water-immiscible organic compound which does not form a stable emulsion with water and which is selected from the group consisting of (a) long chain aliphatic amines containing from about 12 to about 45 carbon atoms and having a solubility in water of less than 0.2 gm/100 gms of water at 25° C, and (b) salts of said amines having a solubility of less than 5 gms/100 gms of water at 25° C, to yield, by a transfer reaction, an organic liquid phase containing at least one sulfur-containing salt of said nitrogen compound; then
contacting said last-mentioned organic phase containing at least one sulfur-containing salt of said nitrogen compound with hydrogen sulfide to reduce the sulfur-containing salts therein to elemental sulfur and regenerate said nitrogen-containing organic compound.

* * * * *

UNITED STATES PATENT OFFICE
CERTIFICATE OF CORRECTION

Patent No. 4,101,643  Dated July 18, 1978

Inventor(s) Shao E. Tung

It is certified that error appears in the above-identified patent and that said Letters Patent are hereby corrected as shown below:

Col. 1, line 21, change "sulphite" to --sulfite-- ;

Col. 1, line 23, change "aqueos" to --aqueous-- ;

Col. 3, line 6, change "constitutng" to --constituting-- ;

Col. 5, line 19, change "SOhd 2" to --$SO_2$-- ;

Col. 5, line 59, change "($SO_3^-$)" to --($SO_3^=$)-- ;

Col. 5, line 60, change "($HPO_4^-$)" to --($HPO_4^=$)-- ;

Col. 5, line 66, change "$HSO_3^-$ and $H_2PO_4^-$" to

--$HSO_3$ and $H_2PO_4$-- ;

Col. 6, line 47, change "state" to --stated-- ;

Col. 9, line 18, delete "organic" and insert --(org) denote-- ;

UNITED STATES PATENT OFFICE
CERTIFICATE OF CORRECTION

Patent No. 4,101,643   Dated July 18, 1978

Inventor(s) Shao E. Tung

It is certified that error appears in the above-identified patent and that said Letters Patent are hereby corrected as shown below:

Col. 9, line 24, change "$HPO_4^-$" to --$HPO_4^=$-- ;

Col. 12, line 14, change "$HSO_3$(org" to --$HSO_3$(org)-- ;

Col. 15, line 8, capitalize "primene".

Signed and Sealed this

Seventeenth Day of April 1979

[SEAL]

Attest:

RUTH C. MASON
Attesting Officer

DONALD W. BANNER
Commissioner of Patents and Trademarks